Oct. 14, 1941.　　　F. C. FRANK　　　2,258,888
BRAKE
Original Filed June 22, 1934　　2 Sheets-Sheet 1

INVENTOR.
FREDERICK C. FRANK
BY Jerome R. Cox
ATTORNEY.

Oct. 14, 1941.   F. C. FRANK   2,258,888
BRAKE
Original Filed June 22, 1934   2 Sheets-Sheet 2

INVENTOR.
FREDERICK C. FRANK.
BY Jerome R. Cox.
ATTORNEY

Patented Oct. 14, 1941

2,258,888

UNITED STATES PATENT OFFICE 2,258,888

BRAKE

Frederick C. Frank, South Bend, Ind., assignor to Bendix Products Corporation, South Bend, Ind., a corporation of Indiana Original application June 22, 1934, Serial No. 731,939, now Patent No. 2,208,575, dated July 23, 1940. Divided and this application June 8, 1938, Serial No. 212,447

2 Claims. (Cl. 188—152)

This application relates to hydraulic braking systems and is illustrated by a braking system particularly adapted for use with airplanes. This application is a division of my copending application Serial No. 731,939, filed June 22, 1934, and issued July 23, 1940, as Patent No. 2,208,575.

One of the objects of this invention is the provision of a braking system for airplanes which is very simple and economical to design and build.

A further feature is the design of the supporting members for the brake shoes and wheel cylinders, especially in that there is provided a brake flange arranged to be shrunk upon the axle of the wheel associated therewith.

Further features and objects of the invention will be apparent after a reading of the subjoined specification and claims and after a consideration of the accompanying drawings, in which:

Figure 1:
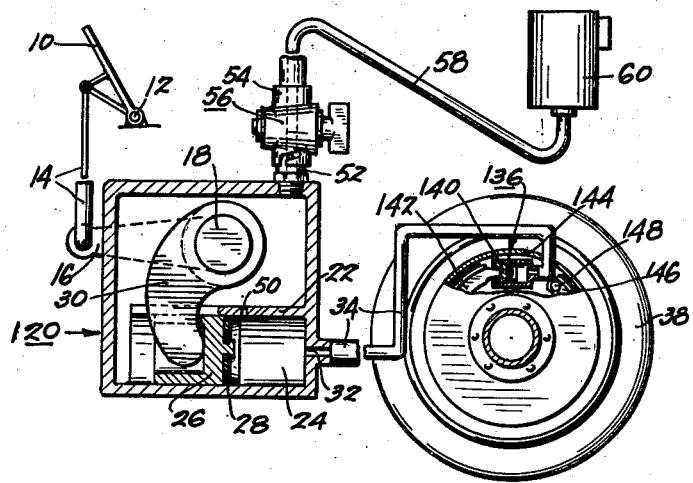
Figure 1 is a view partly diagrammatic, partly in elevation, and partly in section illustrating my invention, but having some parts broken away for clearness.

Referring particularly to the structure shown in Figure 1, it may be seen that there is illustrated a brake pedal 10 pivoted upon a rudder pedal 12. The pedal 10 is connected by a link 14 with a lever 16 adapted to rotate the shaft 18 of the master cylinder 120.

To the cylinder 120 there is connected a conduit 34 leading to a wheel cylinder 136. The wheel cylinder 136 is mounted on a backing plate of a landing wheel 38. The wheel cylinder may be provided with a piston 140 contacting with one end of a brake shoe 142 and adapted to urge said shoe into contact with the drum 144. The shoe 142 may be connected with the secondary shoe 146, which may be pivotally anchored at 148 adjacent to the cylinder 136.

When filling the system, the filler member 52 of the cylinder 120 may have attached thereto a sleeve 54 containing a valve 56 controlling a conduit 58 leading from a supply reservoir 60.

Figure 4:
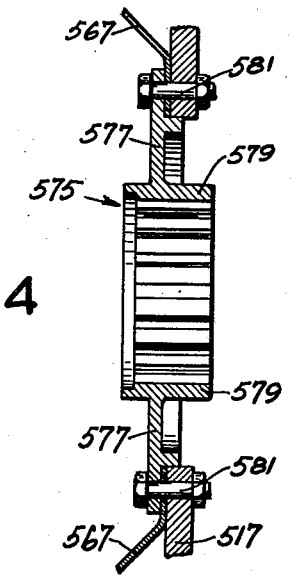
Figure 4 is a fragmentary view in section showing a portion of the structure shown in Figure 2, with the axle removed.
Figure 2:
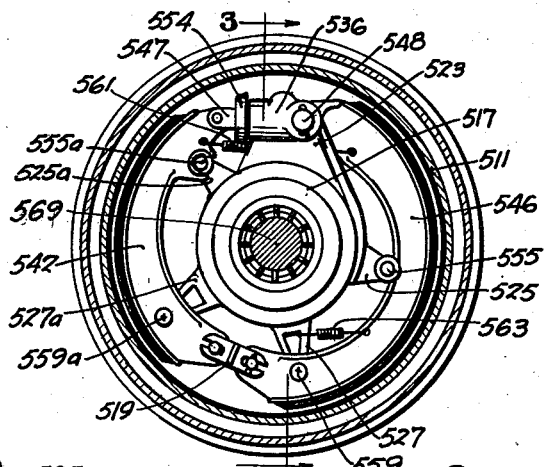
Figure 2 is an enlarged view in elevation of the wheel structure which is shown more or less diagrammatically in Figure 1, some parts being removed for clearness.
Figure 3:
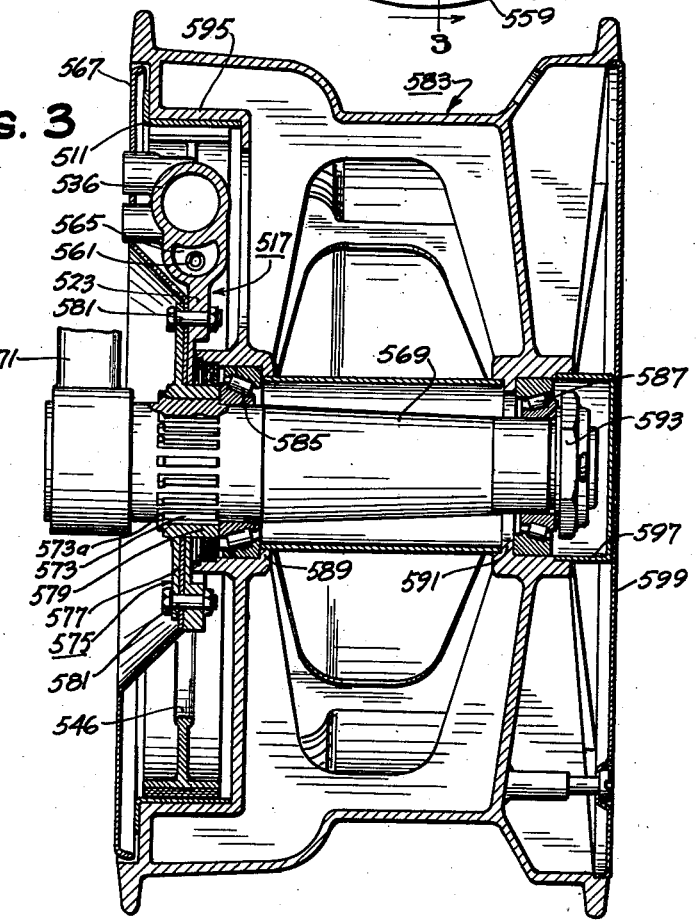
Figure 3 is a view on an enlarged scale and in section of the wheel shown in Figure 2, being taken substantially on the line 3—3 of Figure 2.

The wheel and wheel brake structure of Figure 1 are shown more clearly in Figures 2, 3 and 4. This structure is somewhat similar to the structure disclosed in my copending application Serial No. 723,789, now issued as Patent No. 2,038,213, and the arrangement of the central cast spider formed with the integral applying cylinder and with integral arms serving to anchor the brake members, to position the brake members radially of the drum, and to determine the released position of the brake members is intended to be claimed in said copending application, as is also the combination of such a cast member with a stamped portion.

As shown in Figures 2, 3 and 4 there is provided a drum 511 with which there are associated brake shoes 542 and 546. The shoes are similarly connected by an adjustable link 519 and there is provided a cast spider 517. The spider 517 is formed with arms 523, 525, 525$^a$ and 527 and 527$^a$. The arms 525 and 525$^a$ are provided with rollers 555 and 555$^a$ for determining the released position of the shoes and the arms 527 and 527$^a$ are provided with spring pressed steady rests 559 and 559$^a$ for determining the lateral position of the shoes. The arm 523 is provided with an anchor pin 548, and a cylinder 536 cast integrally therewith. The cylinder is provided with a piston, not shown, connected by a piston rod 547 with the applying end of the shoe 542. A dust cap 554 is also provided for the end of the cylinder. As is shown more clearly in Figure 3 the arm 523 is formed with a passageway 565 through which the spring 561 extends. The shoe 546 is connected to the arm 527 by a spring 563 which together with the spring 561 connected to the upper ends of the shoes 542 and 546 serves to return the shoes to their released position when the brake applying force is withdrawn.

As may be seen most clearly in Figure 3, the spider 517 together with the cylinder 536 is positioned exactly in the central plane of the shoes and the brake drum. The spider 517 carries a light stamped plate 567 which serves to prevent the entrance of dirt into the drum and which together with the spider forms the backing plate for the brake.

My improved arrangement by which the various parts of the brake are secured to the wheel and to the axle may be seen most clearly in Figures 2, 3 and 4. The stub axle 569 which carries a supporting part of the airplane or other vehicle is formed with a plurality of integral spline elements such as 573 having radial projections 573$^a$. I provide a collar 575 formed with a brake mounting flange 577 and a bearing spacer sleeve 579. The interior of the sleeve is formed so as to complement the splines 573 and thus the collar 575 is non-rotatably secured to the stub axle 569. The casting 517 and the plate 567 are secured to the brake mounting flange 577 by bolts 581. Thus the stator members of the brake including the spider 517, the brake applying cylinder 536, the anchor 548 mounted on said spider, the brake shoes 542 and 546 supported by the anchor, the cylinder 536, and the dirt protecting cover 567 are all non-rotatably secured to the stub shaft 569.

The stub shaft 569 is supported by a small-diameter wheel generally designated 583. This wheel 583 is formed almost entirely in one piece, but is hollow and is formed with openings wherever possible in order to decrease the weight. Interposed between the wheel and the axle are bearings 585 and 587. The former is positioned between the edge of the sleeve 579 and a flange 589 formed as a portion of the wheel 583. The bearing 587 is positioned between a flange 591 similarly formed as a part of the wheel 583 and a nut 593 screwed upon the outer end of the shaft 569. Thus the collar 575, the bearings 585 and 587, and the wheel 583 are clamped between the radial projections 573ᵃ on the splines 573 and the nut 593. This obviously holds the sleeve 575 and with it the stator parts of the brake against lateral movement as well as against movement of rotation on the stub shaft 569 and holds the wheel 583 against lateral movement on said shaft while allowing rotation thereof.

The wheel 583 has formed integrally therewith a drum shaped portion 595 within which there is positioned the separate drum 511 as a liner. The outer side of the wheel 583 is closed by a cap member 597 and a fairing plate 599.

It is believed that the operation of the structure disclosed would be obvious from the above description. Therein the operator presses upon the pedal 10. This movement forces fluid through the conduit to the wheel cylinder and thus forces the piston outwardly to apply the shoe 542 to the drum. The movement of the drum carries the shoe around and thus applies the shoe 546 to the drum. Both shoes anchor upon the anchor 548 and the spider transmits the braking torque to the axle of the vehicle. When the braking pressure is released the springs corresponding to the springs 561 and 563 withdraw the shoes from their contact with the drum and the braking action is thus released.

It is to be understood that the above-described embodiments of my invention are for the purpose of illustration only and various changes may be made therein without departing from the spirit and scope of the invention.

I claim:

1. In a wheel structure for airplanes, a stub axle formed with splines, an internally grooved sleeve complementing said splines and secured to said axle thereby, a brake including stator members and rotor members, a supporting spider for the stator members of said brake, and means for securing said spider to said sleeve.

2. In a wheel and brake assembly, a stub axle formed with splines, an internally grooved sleeve complementing said splines and secured to said axle thereby, a wheel rotatable about the axle, a brake comprising one or more rotor members rotatable with the wheel and one or more stator members, and a supporting spider for the stator members of the brake, the spider being secured to the said sleeve.

FREDERICK C. FRANK.